J. H. Pitts.

Roofing Apparatus.

N° 57,764. Patented Sept. 4, 1866.

Witnesses:
James H. Layman
Matthew C. ......

Inventor:
Joseph H. Pitts
by Knight Bros
att'ys

UNITED STATES PATENT OFFICE.

JOSEPH H. PULTE, OF CINCINNATI, OHIO.

IMPROVED APPARATUS FOR SPREADING CEMENT.

Specification forming part of Letters Patent No. 57,764, dated September 4, 1866.

*To all whom it may concern:*

Be it known that I, JOSEPH H. PULTE, of Cincinnati, Hamilton county, Ohio, have invented a certain new and useful Cement-Spreading Machine; and I do hereby declare the following to be a full, clear, and exact description thereof, reference being had to the accompanying drawings, making part of this specification.

My improvement consists in a cheap, simple, and effective machine for spreading roofing-cement and other compositions on cloth, paper, or other suitable flexible fabrics; and my invention relates more particularly to certain devices whereby the composition may be spread in a perfectly smooth and uniform manner, and of any desired thickness.

Figure 1:
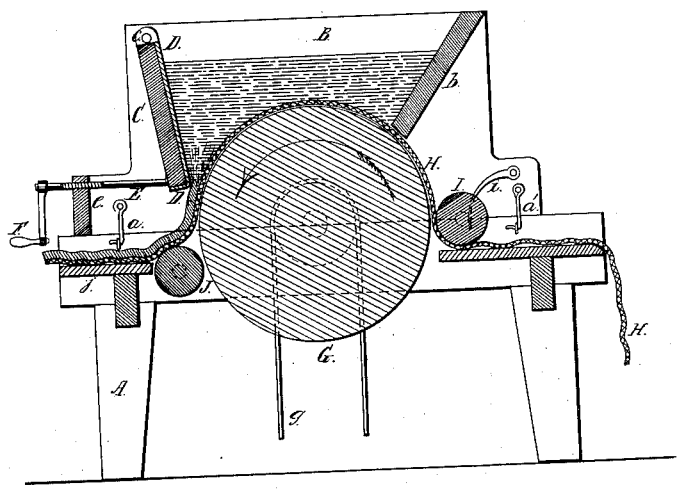
Figure 2:
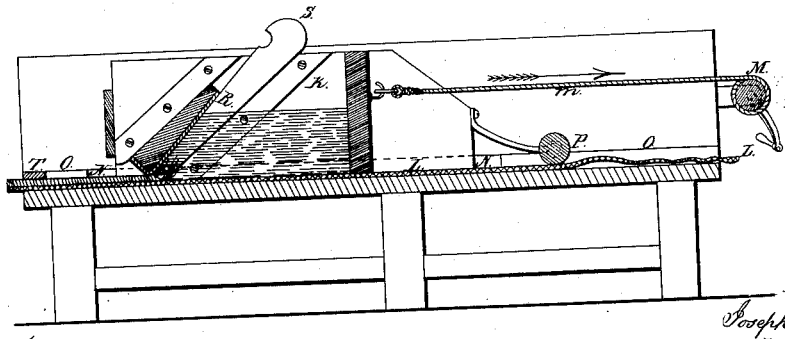

In the accompanying drawings, Figure 1 is a vertical transverse section of a machine embodying my improvements; and Fig. 2 represents a modified form of my machine.

A represents the main frame, which supports a detachable hopper, B, the two being united by means of the hooks and staples $a\,a'$, or other suitable devices.

The ends of the hopper B and one of its sides, $b$, are securely attached to each other, while the remaining side, C, is pivoted to the ends of the hopper at $c$, and thus serves as a gate to regulate the flow of cement or composition from said hopper.

The inner side and lower edge of the gate C are protected by a metallic plate, D, which I term the "trowel," and said trowel may be composed of tin, sheet-iron, zinc, or any suitable substance which will present a perfectly smooth and inflexible surface to the cement as it flows from the hopper. This trowel is adjusted to or from the fabric H, so as to admit of the latter being covered with a greater or less thickness of cement, by means of the set-screw E, which engages with the beam $e$ and presses against the outside of gate C; but, if desired, wedges may be substituted for the screw without impairing the efficiency of the machine.

The set-screw E is operated by the handle or winch F.

G is a large drum or cylinder, which is journaled in the frame A, and the upper portion of said drum revolves within the hopper B in the direction indicated by the red arrow.

The fabric H, which is to be covered with cement or composition, is passed around the periphery of the drum G, and it is held in contact therewith, so as to free it from all kinks and folds, by means of the pressure-roller I, which is operated by the spring $i$.

Located on the opposite side of the drum G from the pressure-roller I is another roller, J, which receives the prepared canvas from the drum and delivers it upon the table or platform $j$, although this platform may be omitted and an endless carrier passed around said roller J, which carrier can be of any suitable length.

In the drawings the drum is represented as being rotated by means of the band $g$; but the machine may be driven by hand-power whenever it is desired.

The operation of this machine is as follows: The fabric H is first passed around the drum G, and the gate C is closed, so as to bring the fabric in close contact with the periphery of said drum, after which the hopper B is filled with cement or composition in a partially-liquid state. The gate C is then opened a distance corresponding to the thickness of the coating of cement which it is desired the fabric shall be covered with, and, the drum G being rotated in the direction of red arrow, a smooth and uniform stratum of the composition is spread on the fabric in the most even and expeditious manner.

The thickness of the coating can be regulated by simply screwing up or unslacking the set-screw E, and it will be seen that as the fabric passes around the drum the convex surface of the latter expands the cloth, so as to open the interstices, thereby permitting the cement to adhere more tenaciously to the fabric.

I have described my machine as operated by a rotary movement; but it is evident that its form may be changed without affecting the principle of the invention; and an inferior modification of my device is shown in Fig. 2, in which the hopper K, instead of being stationary, is caused to advance over the fixed fabric L by means of the rope $m$ and windlass M.

The hopper is confined to a rectilinear path by means of the cleat N, which enters the longitudinal groove O, the fabric being kept straight by a pressure-roller, P, while the trowel R is secured by the wedges S, and the canvas is prevented from moving by the bar T, whose ends are secured in the groove O.

I claim herein as new and of my invention—

1. A cement-spreading machine whose hopper B is provided with an adjustable gate, C, arranged and operating substantially as herein described and set forth.

2. In combination with the adjustable gate C, the trowel D, as and for the purpose explained.

3. In combination with the elements of the two preceding clauses, the set-screw E, or its mechanical equivalent, operating as herein explained and described.

4. In combination with the drum G, the pressure-roller I, for the purpose set forth.

In testimony of which invention I hereunto set my hand.

JOS. H. PULTE.

Witnesses:
H. G. WEBBER,
JAMES H. LAYMAN.